UNITED STATES PATENT OFFICE.

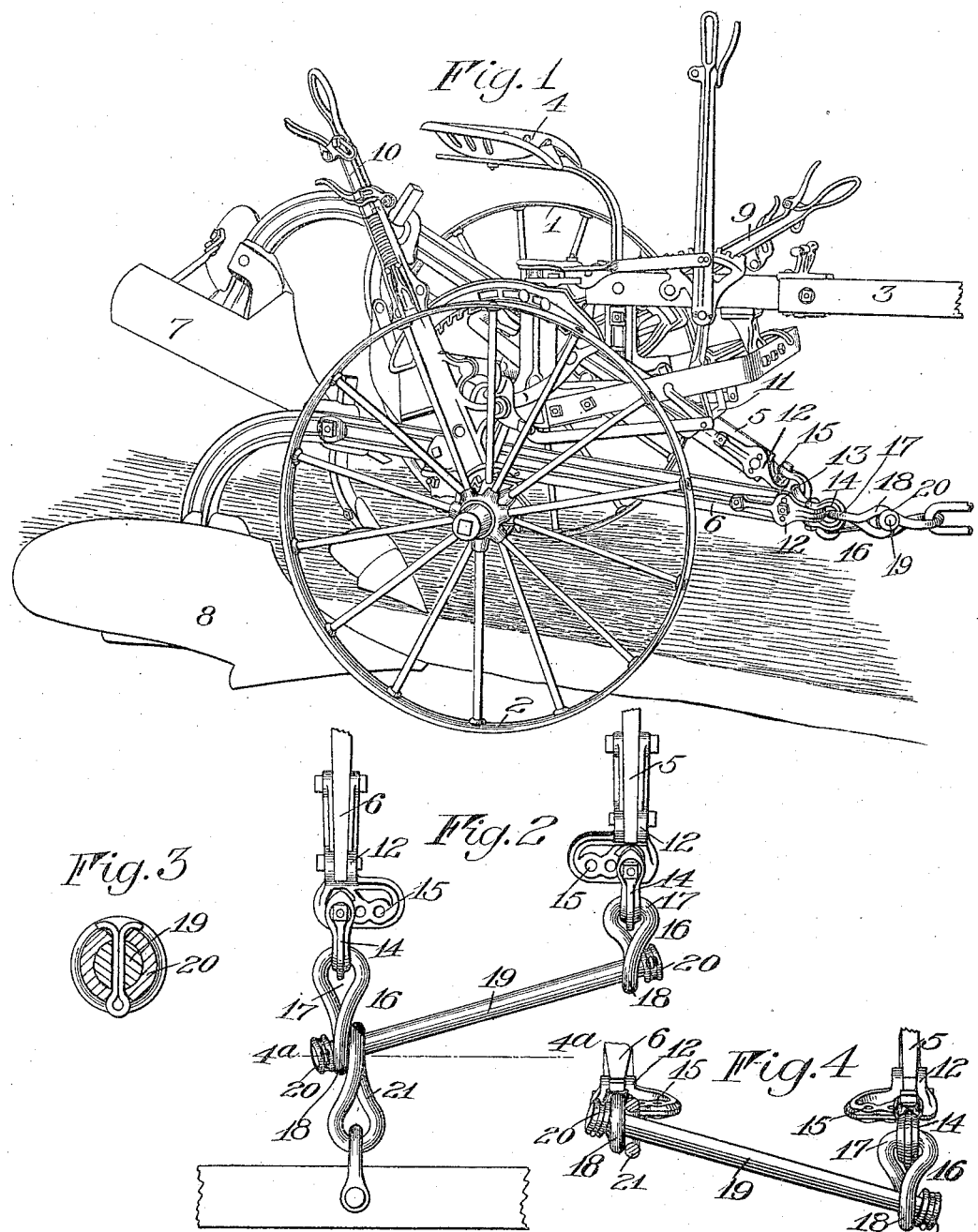

ORATOR FRANK WOODWARD, OF ROCHESTER, NEW YORK.

SULKY-PLOW.

1,238,057.

Specification of Letters Patent.

Patented Aug. 21, 1917.

Application filed March 29, 1916. Serial No. 87,411.

*To all whom it may concern:*

Be it known that I, ORATOR FRANK WOODWARD, of Rochester, in the county of Monroe and State of New York, have invented certain new and useful Improvements in Sulky-Plows; and I do hereby declare the following to be a full, clear, and exact description of the same, reference being had to the accompanying drawings, forming a part of this specification, and to the reference characters marked thereon.

My invention has to do with what are known in the art as sulky or wheeled plows, of the general type embodying a pair of plows adjustably mounted on a wheeled frame and adapted to be selectively placed in engagement with the ground, that is to say in operating position, with facility for elevating the inoperative plow above the ground, and in which the plows are arranged each on a plow supporting beam which swings, during adjustment, about a point that passes through or approximately through the forward end of the beam so that the forward ends of the beams are maintained entirely or very nearly in horizontal alinement irrespective of the position in which the plows are positioned. The forward ends of the beams are joined by a bar or other member that receives the draft device to which a team of horses or other source of power is connected, and the purpose of the present invention is to insure proper draft, always in line with the plow in work and its supporting beam, and also to make provision for readily and automatically changing the line of draft when shifting from one plow to the other. In a more specific aspect, the invention has for its object to afford a simple and efficient means for supporting the bar which connects the forward ends of the beams and which carries the draft device, so that the latter will adjust itself to its proper position in the line of draft, and be maintained in such position as long as the position of the plows remains unchanged, so as to render the operation of the draft device entirely automatic and completely obviate any necessity of attention from the operator. To these and other ends the invention consists in certain improvements and combinations of parts, all as will be hereinafter more fully described, the novel features being pointed out in the claims at the end of the specification.

In the drawings:

Figure 1 is a perspective view showing a plow of the type referred to embodying my invention according to a preferred arrangement;

Fig. 2 is a plan view enlarged, illustrating the forward ends of the plow supporting beams and showing the draft device in line with the end of the beam of the plow in work;

Fig. 3 is a detail sectional view showing the manner of attaching the head or enlargement on the bar which connects the forward ends of the beams, and Fig. 4 is a sectional view on line 4ª—4ª of Fig. 2.

Similar reference characters throughout the several views indicate the same parts.

In the operation of sulky plows of the type generally referred to, the forward end of the plow supporting beam of the plow in work is in advance of the forward end of the other beam, as illustrated in Fig. 2, resulting in a corresponding inclination of the bar which connects the forward ends of the beams and a tendency of the draft device to move toward the foremost end of the bar in line with the forward end of the supporting beam of the plow in work. This has not proved sufficient to hold the draft device in its proper position, owing to other forces which act, resulting from the disposition of the forward ends of the plow supporting beams with reference to a horizontal plane, since when the end of the bar in the line of draft is on the same level with or lower than the opposite end of the bar, there is a tendency for the draft device to creep away from the line of draft and to assume a position so spaced from the line of the supporting beam of the plow in work as to interfere with proper plowing. Further difficulty has been experienced in so mounting the bar which connects the forward ends of the supporting beams that it will adjust itself readily, in accordance with the position of the supporting beams, and without possibility of buckling, kinking or sticking of the parts such as frequently occurs in the operation of plows of this character, and requires manual adjustment by the operator.

In the structure which I have adopted as illustrative of one application of the invention, 1 and 2 designate the supporting wheels of a frame which carries a pole 3 and seat 4 for the operator, while 5 and 6 are plow supporting beams adjustable on the frame and carrying at their rear ends the plows 7 and 8, the position of which is controlled by levers 9 and 10 respectively, which are operatively connected with the plow supporting beams for moving the plows into or out of working position in a manner that forms no essential part of the present invention. In the position shown in Fig. 1, the plow 7 is out of work and the plow 8 is in work, while the forward end of the supporting beam 5 of the inoperative plow is in horizontal alinement or substantially horizontal alinement with the other supporting beam, due to the position of the stop plate 11 which limits upward movement of the forward ends of the beams. The supporting beams are provided, each at its forward end with a rigid carrier which is arranged generally so as to swing in a vertical direction about the supporting member, and preferably about an axis approximately horizontal. The connecting bar which carries the draft device is mounted on the said rigid and vertically swinging carriers, and to this end the forward end of each of the supporting beams includes a frame or casting 12 which may be adjusted vertically by means of openings 13, and carries an eye 14 adjustable laterally of the frame 12 by means of openings 15. The rigid carrier is preferably in the form of an integral rod 16 twisted or formed so as to afford loops or eyes 17 and 18 at its ends and disposed at a right angle to each other. The eye or loop 17 engages the aforesaid eye 14 while the eye 18 receives the connecting bar 19 having heads or enlargements 20 at its ends to prevent removal from the rigid carrier. It will be understood that the connecting bar 19 is mounted on each plow supporting beam by a carrier such as I have just described, and this arrangement permits the entire connecting bar 19 to swing bodily in a vertical direction with reference to the supporting beams, the result of which is that when one of the plows is in working position, and draft is exerted on the corresponding end of the connecting bar 19 the latter, together with its rigid carrier will be elevated in the manner shown in Figs. 1 and 4, whereas the opposite end of the connecting bar and its carrier swings downwardly to a position beneath the line of draft as indicated in Fig. 4. 21 designates the draft device which is slidable along the bar 19 and is preferably of the same form as the rigid carrier which has already been described. Upon the exertion of pull on the draft device 21, it assumes its proper position at the forward and uppermost end of the connecting bar 19, as shown in Figs. 2 and 4, and any tendency of the draft device to move from this position is successfully overcome as long as draft is exerted by the downward inclination of the bar 19 toward its opposite end, due to the movability of said opposite end of the connecting bar and its rigid carrier in a vertical direction with reference to the supporting beam of the plow out of work.

It will be obvious that the particular method of mounting the rigid carrier at the forward end of the supporting beams, consisting of the frame 12 and eye 14 is not an essential part of the invention, and the structure may be modified in any advantageous way as long as the fundamental idea of a rigid carrier mounted at the forward end of each plow supporting beam for vertical swinging movement with reference thereto is carried out. A chief advantage of my improvement resides in the rigidity of the carrier extending between the front end of the beam and the connecting bar, since by the present arrangement, I successfully overcome and prevent any kinking or locking of the connecting bar 19 or other tendency that might interfere with its free and easy movement under all conditions, insuring instant response of the draft device, by sliding movement along the connecting bar, when the positions of the plows are changed to place the operative plow out of work and the other plow in work. Such operation results in a reversal of the position of the plow supporting beams and of the connecting bar between their forward ends, and as soon as this reversal takes place, upon exertion of pull on the draft device, the latter immediately moves along the connecting bar and assumes its proper position in the line of draft adjacent to the other rigid carrier without any adjusting or assisting of positioning by the operator.

I claim as my invention:

1. The combination with a pair of plows and plow supporting beams adapted to be independently controlled for placing either plow in operation, of a rigid carrier pivotally mounted at the forward end of each beam, having movement thereon in a vertical direction, and provided at its outer end with an opening or eye, a connecting bar passing through said openings and having heads or enlargements at its ends to prevent removal through the openings, and a draft device slidable along the connecting bar.

2. The combination with a pair of plows and plow supporting beams adapted to be independently controlled for placing either plow in operation, of a rigid carrier pivotally mounted at the forward end of each beam having movement thereon in a vertical direction, and comprising an integral rod forming two loops or eyes, arranged substantially at a right angle to each other, the inner eyes having connection with the beams and the outer eyes receiving a connecting bar, permitting one end of the bar to assume a position above the other when the front ends of the beams are in horizontal alinement, and a draft device slidable along the connecting bar.

ORATOR FRANK WOODWARD.

Witnesses:
PAULINE L. DEAN,
RUSSELL B. GRIFFITH.

Copies of this patent may be obtained for five cents each, by addressing the "Commissioner of Patents, Washington, D. C."